Dec. 15, 1959     I. S. GOLDSTEIN ET AL     2,917,408
METHOD OF IMPARTING FLAME RETARDANCE TO WOOD
Filed April 1, 1958
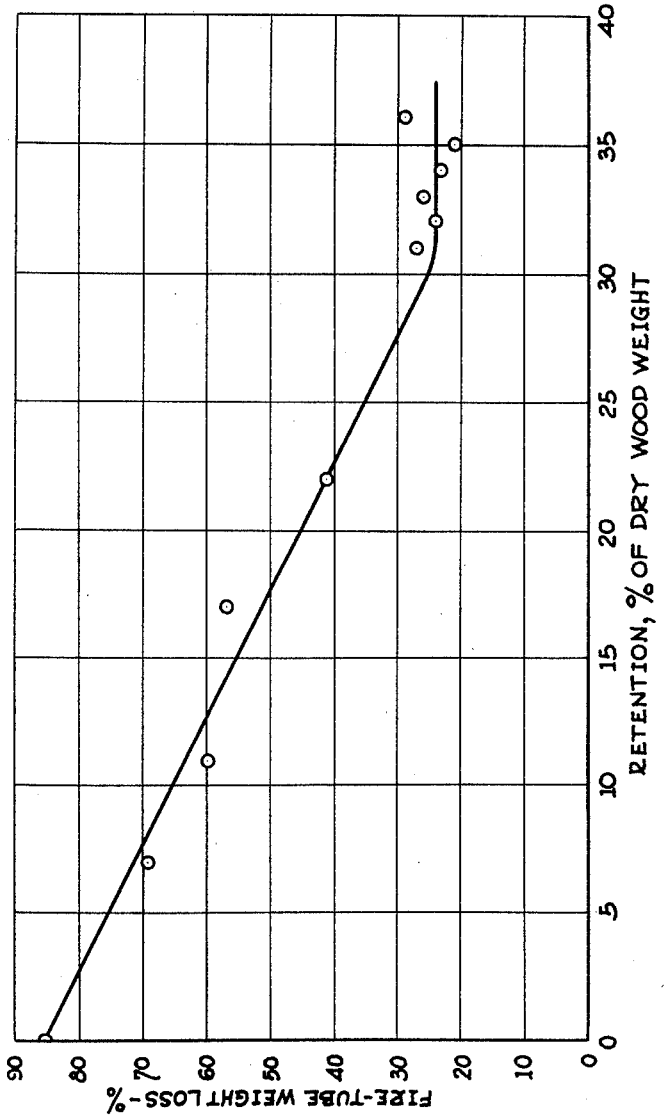
INVENTORS.
IRVING S. GOLDSTEIN,
WILLIAM A. DREHER.
BY J. E. Armstrong
their ATTORNEY.

United States Patent Office 2,917,408
Patented Dec. 15, 1959

2,917,408

METHOD OF IMPARTING FLAME RETARDANCE TO WOOD

Irving S. Goldstein, Pittsburgh, and William A. Dreher, Verona, Pa., assignors to Koppers Company, Inc., a corporation of Delaware Application April 1, 1958, Serial No. 725,629

5 Claims. (Cl. 117—103)

This invention relates to the chemical treatment of wood. In one specific aspect, it relates to a novel impregnation technique whereby wood is rendered flame-retardant and is stabilized against dimensional change. In a further aspect, the invention relates to a wood product characterized by non-leachable flame-retardance, substantially undiminished impact strength, resistance to fungi and enhanced dimensional stability, and a method for producing such product. In still another aspect, it relates to novel impregnating solutions for wood treatment.

The wood preserving art is replete with methods to improve one or more of the characteristics of a wood product to make that product more suitable as a construction material. Efforts have been made, for example, to devise wood treatments to diminish the decay of wood caused by attack of various common fungi. It has also been considered desirable to treat wood products to increase their dimensional stability. It is well-known that wood undergoes an increase in dimension upon absorption of moisture from the atmosphere, and a contraction when moisture is given up to the atmosphere upon a decrease in humidity. Such swelling and shrinkage are accompanied by warping and checking, which obviously are objectionable when wood is to be used for construction purposes. In providing methods to increase decay resistance and to increase the dimensional stability of wood, it has been necessary for workers in the art to consider (1) the cost of such a treatment, (2) the corrosive nature of the chemicals to be incorporated in the wood, and (3) the effect of the treatment on the mechanical strength of the wood.

Attention has also been given to the production of a flame-retardant wood. Certain impregnation and coating treatments have been developed which retard the burning tendency of wood with varying success. In spite of this, the fire-retardant treating industry has never flourished to the same extent as the preservative industry. Present commercial treating methods are suitable only wherein the wood is not subject to leaching; thus their use has been limited to a considerable extent. Impregnation techniques for making flame-retardant wood involve the deposition of a chemical composition within the pores of the wood. Chemicals commonly used for this purpose include ammonium phosphate, ammonium chloride, ammonium sulfate, borax, boric acid, phosphoric acid, zinc chloride, and magnesium chloride. Certain of these salts are objectionable because of their corrosive nature and their tendency, upon exposure to flame, to cause an after-glow within the wood. Often the impact strength of the treated wood is diminished. In summarizing the effectiveness of the known impregnation treatments, the Forest Products Laboratory, Forest Service, U.S. Department of Agriculture, in their Report No. 2081 of April 1957 entitled "Flame-Retardant Treatments for Wood," observed that the known impregnation treatments are limited in that the fire-retardant leaches away from the wood upon exposure to rain and ground water. It is quite obvious, therefore, that the known impregnation techniques are unsuitable for exterior and underground construction, wherein a non-leachable flame-retardant wood is required.

U.S. Patent 2,482,755 describes a method for imparting flame resistance to cellulosic and protein fibrous materials, especially textiles. That process comprises impregnating a textile with an inorganic acid in combination with a non-metallic, organic base, using a preferred ratio of base to acid of about 4.4 mols to 1 or higher, and thereafter curing the impregnated textile at a temperature of 250° F. to 400° F. for 30 seconds to 120 minutes. As his inorganic acid, the patentee prefers to use phosphoric acid. Among the effective bases are listed urea, biuret, cyanacetamide, semicarbazide, dicyandiamide, acetamide, formamide, and melamine. In some cases, the solubility of the organic base is not sufficiently high even in hot solution, and such a base must be used in conjunction with one of the other organic bases to produce a good working solution. The patentee alleges that his process is suitable for the treatment of wood.

Unfortunately, there is a considerable difference in practice between the preservation of textiles and the preservation of wood. In wood treating, an impregnator must be capable of reacting with wood at relatively low curing temperatures. If the reaction does not occur at these low temperatures, the impregnator will be washed from the wood upon contact with water, and the wetted product will not be flame-retardant. If high curing temperatures are used to cause sufficient reaction between impregnator and the wood, the mechanical strength of the wood will be diminished.

Flame-retardance of wood is conveniently measured by the percent weight loss in the fire tube test, a standard test method which will be described hereafter in the specification. It is considered by workers in the art that a fire tube weight loss of above 50% is indicative of poor flame-retardance. For a wood product for use in exterior construction, the results of a fire tube test on a product leached with water are particularly significant.

An effort was made to use the process described in U.S. 2,482,755 to impart flame-retardant properties to wood. Using the preferred combination of urea and phosphoric acid (in a 3:1 mol ratio) in the impregnating solution and a one hour cure at 140° C. (284° F.) following the impregnation step, there was obtained a product having satisfactory non-leachable flame-retardant properties. A product given a final cure of 140° C. for only ½ hour was found to be unsatisfactory in respect of its flame-retardance after leaching. Unfortunately, however, the high temperature cure required using the patentee's process had a deleterious effect; the impact strength of the wood was reduced in amounts ranging from 15 to 47% from that of an untreated specimen, depending upon the final curing temperature used.

Mere reduction of the curing temperature does not solve the problem of producing a non-leachable flame-retardant wood of undiminished impact strength. Formulations were made following the teachings of several of the patentee's examples using a curing temperature of 90° C., which is low enough to avoid degradation of the wood product. Unfortunately, the low curing temperatures failed to promote sufficient reaction between the impregnator and the wood. Hence, the fire tube weight loss after leaching ranged from 75–79%. This finding was not unexpected in view of the teachings of the patent, since the patentee asserted that a curing temperature of at least 250° F. (121° C.) was required for his process.

Acceptable curing temperatures for wood vary with the type of wood and the thickness of the wood to be cured. Wood, with the exception of veneers, requires long heating before pieces of any size can be uniformly heated. For example, the center of a 4" x 4" piece of timber will reach the external temperature of 200° F. in six hours, but it would require almost 24 hours for the center of an 8" x 8" piece of timber to reach this temperature. The cooling of large pieces of wood is also slow. If, during processing, wood remains at an elevated temperature for too long a period of time, considerable degradation may take place. It is known that, for any fixed time of heating, the relationship between the temperature and its effect on the mechanical strength of wood does not vary in direct proportion to an increase in temperature; instead, it varies according to some power function. It is generally accepted in the wood preserving industry that any heating or curing of the wood product should be at as low a temperature and for as short a period of time as possible. Preferably, for most types of wood, the curing temperature should not exceed 100° C. It is readily apparent that the prior impregnation techniques either failed to impart non-leachable flame-retardant properties to the wood or, because of the high curing temperatures required, they resulted in a non-leachable wood product of diminished impact strength.

Although workers in the art have heretofore unsuccessfully attempted to provide a non-leachable wood product of high impact strength, such a product, if limited to those properties alone, would not provide the solution to certain other major problems which might be overcome by the chemical treatment of wood. We have already pointed out that it is desirable, using an impregnation treatment, to produce a decay-resistant, dimensionally stable wood product. Furthermore, to be effective, such an impregnation technique should result in a non-corrosive wood product which is not discolored by the chemical treatment.

We have discovered a novel method which, in its preferred modifications, is adaptable to accomplishing substantially all of the above-mentioned objectives.

It is, therefore, an object of the present invention to provide a method for treating wood to produce a flame-retardant wood, stabilized against dimensional change, of high impact strength. It is a further object to provide a non-leachable flame-retardant wood suitable for exterior construction. A still further object is to provide a non-corrosive, decay-resistant wood product which is not discolored as a result of the chemical treatment.

In accordance with the present invention, wood is impregnated with a solution of dicyandiamide and phosphoric acid, and is thereafter dried and cured by heating it to a temperature of 70–100° C.

The impregnating solution comprises 10–25% by weight of the combined phosphoric acid and dicyandiamide and 90–75% by weight water. Solutions containing less than about 10% by weight of the combined dicyandiamide and phosphoric acid do not impart sufficient fire-retardance to the wood. Moreover, such solutions generally fail to provide the enhanced dimensional stability obtainable by the process of the present invention. Dimensional stabilization of wood according to the present invention is discussed in further detail in the specific examples. Solutions having a weight percent concentration of dicyandiamide and phosphoric acid of greater than 25% may be used effectively, but the cost of such solutions makes them economically unattractive.

In an embodiment of the present invention, it is possible to impart non-leachable fire-retardance to wood by using a treating solution containing between about 17.5–25% by weight of the combined dncyandiamide and phosphoric acid. A concentration of 20% by weight is preferred. If the treated wood is to be used for interior construction, non-leachable fire-retardant properties are generally not required. In such cases, an impregnating solution containing 10–17.5% by weight of dicyandiamide and phosphoric acid gives suitable results.

The mol ratio of dicyandiamide to phosphoric acid in the impregnating solution ranges from about 1:1 to 3:1. If this mol ratio is below about 1:1, the treating solution tends to be too strongly acid and will thus impair the treated product. The mol ratio cannot be higher than about 3:1 because of the limited solubility of the dicyandiamide in water. To offset the relatively low water solubility of dicyandiamide, impregnating solutions having a 2:1–3:1 mol ratio are prepared by decreasing the amount of phosphoric acid in the formulation. The 1:1–2:1 formulations give better results than do the 3:1 formulations, since the reduction in the amount of phosphoric acid present in a formulation tends to diminish the effectiveness of the impregnator as a fire-retardant.

Dicyandiamide and phosphoric acid react in a heated aqueous solution to form guanylurea phosphate. According to the present invention, the reactants of the impregnating solution may be pre-reacted by combining them at temperatures between about 80° C.–100° C. The pre-reacted solutions offer a slight advantage in that they are of lower acidity and tend thereby to insure no degradation of the wood during treatment. Both the pre-reacted solutions and the unreacted solutions react further with the cellulose of the wood during the curing step. This inter-reaction with the wood helps to provide a good retention of the impregnator within the wood, even after leaching. Furthermore, it tends to reduce the degree to which the wood can swell, thus enhancing the dimensional stability of the treated wood. It is necessary, using the process of the present invention, to add the dicyandiamide and phosphoric acid as independent components to the impregnating solution, rather than merely to dissolve preformed guanylurea phosphate in water. Guanylurea phosphate is less soluble and, therefore, less reactive than the reactants of the pre-reacted aqueous solution of dicyandiamide and phosphoric acid. If preformed guanylurea phosphate is added to water and wood is impregnated therewith, a low retention of the impregnator is obtained. This low retention is reflected in an unsatisfactory fire tube weight loss of 57% after leaching.

To form conveniently the impregnating solution of the present invention, a predetermined quantity of water is heated to a temperature of about 50–60° C. A predetermined quantity of dicyandiamide is dissolved in the water. When solution is complete, the phosphoric acid is slowly added. After the addition of the phosphoric acid, the solution may be heated to cause an exothermic reaction and the formation of guanylurea phosphate.

The decay-resistance imparted to wood by our novel impregnating solutions is enhanced by a particular embodiment of the present invention. We have discovered that our impregnating formulations may be fortified to impart superior decay-resistance to a wood product by the addition of from 2–5% by weight of a member selected from the group consisting of chromated copper arsenate, chromated zinc arsenate, and chromated zinc chloride. The "chromated" salts are physical blends of salts known in the art as Erdalith, Boliden salts, and CZC, respectively. Formulations for these salts are given in the AWPA Manual of Recommended Practice, Standard P5–56. These decay-resistant additives have been found to be compatible with the phosphoric acid-dicyandiamide formulations hereinbefore described. The fortified formulation may be stored before impregnation for several days at a temperature of 50° C. with only a slight precipitation of the chloride or arsenate salts therefrom. The decay resistance of the treated wood after exposure to inclement weather, described hereafter in the specific examples, is greatly increased by adding to the impregnating solutions the indicated amount of such salts.

Impregnation of the wood is conveniently accomplished by a full cell cycle. The object of the full cell process is to fill the capillary structure of the wood with the treating solution. This is accomplished by subjecting the treating reactor, containing the wood to be treated, to a vacuum of about 22–26" of mercury for a period of time ranging from about 15 minutes to an hour. The reactor is then filled with treating solution and subjected to a pressure of about 125–200 p.s.i. at 25–100° C. for about 1½ to 3 hours. The larger and more refractory pieces of wood require either a longer vacuum period, or longer pressure period, or perhaps both. For most woods, a 15 minute vacuum of 25–26 inches of mercury followed by a 2 hour pressure period of 160 p.s.i. at 50–60° C. is adequate.

Other standard impregnation techniques known to the art can also be used; depending, of course, on the physical nature of the wood. For example, impregnation may be accomplished by soaking, by vacuum impregnation at atmospheric pressure, by alternate application of pressure and vacuum or by the "empty cell" process. The "empty cell" process involves forcing the impregnating solution under pressure into wood containing air. The back pressure, caused by compressing the air within the wood, forces out part of the solution when the pressure is released.

After the impregnation treatment, the wood is placed in a drying oven or kiln to dry and cure the treated wood. Wood is dried in a conventional manner to a fairly low moisture content at temperatures between about 40°–70° C. and is thereafter cured by heating it to temperatures between 70° C. and 100° C. We have already indicated the adverse effect of curing temperatures above 100° C. Most woods, unless heated in very thin sections for short periods of time, cannot withstand a curing temperature higher than this without impairment of mechanical strength. If the treated wood is cured at a temperature below about 70° C., the dicyandiamide and phosphoric acid do not become fixed within the cellular structure of the wood, and hence they are leached away upon exposure to water. The resulting product is obviously not one having non-leachable flame-retardant properties. Moreover, the dimensional stability of such wood is not improved. The curing temperatures of the method of the present invention offer particular advantage in that commercial dry kilns are designed to operate at such temperatures.

Often it is convenient to effect the initial curing at temperatures of about 70° C. and the final curing at temperatures of about 90° C. The curing cycle selected will vary with the size and the properties of the pieces of wood to be treated. For example, most woods can be suitably cured using an initial cure of 15–25 hours at about 70° C. followed by a final cure of from 4 to 12 hours at about 90° C. The curing process should be as rapid as possible within the prescribed temperature limits to prevent slight degradation by unbound phosphoric acid. As the curing temperature is decreased, the curing time must be increased. The curing temperatures discussed hereabove refer to the temperature of the wood itself, rather than the temperature of the surrounding atmosphere in which the wood is heated.

Referring now to the drawing, the figure represents the weight loss of leached pine fire tube specimens treated with 1:1 mole ratio dicyandiamide-phosphoric acid solutions of varying strength plotted against the weight increase measured as percent retention of treating solution solids (before leaching) based on the dry wood weight. It will be observed that between 0 and 30% retention, the values obtained are in a straight line relationship. To obtain a fire tube weight loss of less than 50% after leaching, there must be at least a 17.5% retention of the treating solution solids. There seems to be no particular advantage gained by obtaining more than a 30% retention of the treating solution solids in the wood. For most woods, the desired range of retention is obtained by using treating solutions of the strength hereinbefore indicated, viz: those containing between about 17.5–25% by weight of the combined dicyandiamide and phosphoric acid. However, for a particular wood the retention values indicated in the figure are a better criterion for measuring acceptable fire-retardance, since pick-up from a solution of any given strength depends so much on the density of the wood. The data on which the figure is based are shown hereunder in Table I.

TABLE I

| Treating Solution Concentration, Percent | Retention of Treating Solution Solids in Unleached Wood,[1] Percent | Fire Tube Weight Loss After Leaching, Percent |
|---|---|---|
| 0 | 0 | 85 |
| 5 | 7 | 69 |
| 10 | 11 | 60 |
| 15 | 17 | 57 |
| 23 | 22 | 41 |
| 23 | 31 | 27 |
| 23 | 32 | 24 |
| 23 | 33 | 26 |
| 25 | 34 | 23 |
| 23 | 35 | 21 |
| 23 | 36 | 29 |

[1] All specimens given a final cure of 100° C.

We have discussed in a general way methods for obtaining particular improvements in the property of wood. In the examples that follow, four properties of the treated wood, viz: fire-retardance, impact strength, dimensional stability, and decay resistance are described in detail. The test method used to measure each property is specified, and wood, treated by the novel process of the present invention, is evaluated in respect thereof. Corrosiveness of the treating solution is also determined.

Our invention is further illustrated by the following examples.

EXAMPLE I.—FIRE-RETARDANCE AND IMPACT STRENGTH

Wood specimens were treated under a variety of conditions, using the method of the present invention, to evaluate their fire-retardance and impact strength. In order to demonstrate the remarkable improvement obtained by our method, comparative tests were made using numerous prior art impregnating techniques.

To determine fire-retardance, the specimens used for the impregnations were of clear sap southern pine, ⅜" x 1⅝" x 22" long. Ten of these specimens were provided for each treatment, five of which were used to determine fire-retardance without leaching and five to obtain a comparative measurement after leaching with tap water. After impregnation, drying and curing, the specimens which were not to be leached were placed in an air-conditioned room to equilibrate at 23° C. and 50% relative humidity. The specimens which were to be leached were separated by untreated sticks and submerged in a tank of tap water. Tap water was allowed to flow through the tank for seven days. At the end of the seventh day, the specimens were placed in a forced convection oven to dry for 48 hours at 50° C. The leached specimens were then placed in an air-conditioned room to equilibrate. When the specimens had reached equilibrium, they were ripped lengthwise and assembled into the required ⅜" x ¾" x 40" fire tube specimens. They were then tested in the fire tube apparatus in accordance with the fire tube test, ASTM Standard E69–50. This test measures the loss in weight of the sample on exposure to a standard flame for a standard period of time. Low weight losses are indicative of good fire-retardant properties. Weight losses of less than 35% meet railroad specifications. Weight losses of above 50% are considered poor in respect of their fire-retardance. The weight loss of untreated wood is 80–90%.

To determine the impact strength of the wood, 10, 15, or 20 southern yellow pine impact test specimens (½" x ½" x 5") were provided for each treatment. After impregnation, drying, and curing, the impact specimens were open-stacked in the air-conditioned room to equilibrate at 23° C. and 50% relative humidity. When equilibrium had been attained, the specimens were tested on a standard impact tester known as a "Tinius Olsen plastics impact tester" using the "Charpy head" on a four inch span. Alternate specimens were broken in the radial and tangential directions. The average of 10, 15, or 20 values is reported in Table II.

Table II is self-explanatory. In the table there is given a description of the treatment used, the composition of the impregnation formulation, the cure conditions, leaching conditions, the weight increase caused by treatment, the weight increase resistant to leaching, the weight percentage loss in the fire tube test, the time of after-flame in seconds, and the impact strength in inch-pounds. Impregnation formulations were prepared by dissolving the indicated amount of organic base in water and adding thereto the required amount of phosphoric acid. Impregnation was accomplished using a full cell cycle comprising a 15 minute vacuum of 25–26 inches Hg followed by a two hour pressure period of 160 p.s.i. at 50–60° C. After the impregnation step, the wood specimens were placed in a drying oven, dried and cured thereafter under the conditions indicated in the table.

TABLE II

| Description of Treatment | Formulation | Cure Conditions, ° C. | Leaching | Weight Increase caused by Treatment, Percent of original dry weight | Weight Increase Resistant to Leaching, Percent of original dry weight | Percent Weight Loss in Fire Tube Test | After-Flame, seconds | Impact Strength, In.-lbs. Specimen | Impact Strength, In.-lbs. Control |
|---|---|---|---|---|---|---|---|---|---|
| 23% dicyandiamide: Phosphoric acid. Prereacted, 50° cure | 1,440 g. $H_3PO_4$ (85%); 1,040 g. dicyandiamide; 7,490 g. $H_2O$. Heated to exotherm | 48 hrs. at 50° | No; Yes; No | 24; 26; 39 | 3.5 | 14; 62 | 0; 60 | 52 | 67 |
| 23% dicyandiamide: Phosphoric acid. Prereacted, 70° cure | 1,440 g. $H_3PO_4$ (85%); 1,040 g. dicyandiamide; 7,490 g. $H_2O$. Heated to exotherm | 24 hrs. at 70° C | No; Yes; No | 29; 26; 36 | 7.9 | 14; 41 | 0; 26 | 65 | 67 |
| 23% dicyandiamide: Phosphoric acid. Prereacted, 85° cure | 3 lb. 7 oz. dicyandiamide; 4 lb. 12 oz. $H_3PO_4$ (85%); 24 lb. 13 oz. $H_2O$. Heated to exotherm | 24 hrs. at 85° C | Yes; No | 36; 32 | 8.8 | 29 | 0 | 73 | 67 |
| 23% dicyandiamide: Phosphoric acid. Prereacted, 90° cure | 1,440 g. $H_3PO_4$ (85%); 1,040 g. dicyandiamide; 7,490 g. $H_2O$. Heated to exotherm | 24 hrs. at 90° C | No; Yes; No | 28; 32; 37 | 8.4 | 16; 32 | 0; 0 | 70 | 67 |
| 23% dicyandiamide: Phosphoric acid. Prereacted, 100° cure | 1,440 g. $H_3PO_4$ (85%); 1,040 g. dicyandiamide; 7,490 g. $H_2O$. Heated to exotherm | 24 hrs. at 100° C | No; Yes; No | 31; 33; 44 | 8.1 | 14; 23 | 0; 2 | 63 | 67 |
| 23% dicyandiamide: Phosphoric acid. Prereacted, 130° cure | 3 lb. 7 oz. dicyandiamide; 4 lb. 12 oz. $H_3PO_4$ (85%); 24 lb. 13 oz. $H_2O$. Heated to exotherm | 20 hrs. at 100° C; 2 hrs. at 130° C | No; Yes; No | 32; 31; 37 | 15 | 14; 22 | 0; 0 | 54 | 67 |
| 23% dicyandiamide: Phosphoric acid. Prereacted, 150° cure | 1,440 g. $H_3PO_4$ (85%); 1,040 g. dicyandiamide; 7,490 g. $H_2O$. Heated to exotherm | 20 hrs. at 100° C; 2 hrs. at 150° C | No; Yes; No | 25; 26; 33 | 5.6 | 13; 26 | 0; 0 | 41 | 67 |
| 20% dicyandiamide: Phosphoric acid. 90° cure | 9.3 parts dicyandiamide; 12.6 parts $H_3PO_4$ (85%); 78.1 parts $H_2O$ | 20 hrs. at 70° C; 4 hrs. at 90° C | No; Yes; No | 32; 31; 32 | 8.5 | 16.5; 28.0 | 0; 0 | 62 | 57 |
| 25% guanylurea phosphate. 90° cure | 25 parts guanylurea phosphate, 75 parts $H_2O$ (insoluble crystals formed) | 24 hrs. at 90° C | No; Yes; No | 20; 21; 24 | 7 | 20; 57 | 0; 53 | 67 | 67 |
| 19% urea-phosphoric acid. Phosphate. 140° cure | 3,450 g. $H_2O$; 372 g. guanylurea phosphate; 450 g. urea | 20 hrs. at 100° C; 2 hrs. at 140° C | No; Yes; No | 15; 16; 19 | 4.6 | 23; 56 | 0; 70 | 63 | 68 |
| 16% urea-phosphoric acid, 3:1. 100° cure | 14,860 g. $H_2O$; 1,242 g. $H_3PO_4$ (85%); 1,890 g. urea | 22 hrs. at 100° C | No; Yes | 21; 19 | | 20; 62 | 0; 58 | | |
| 19% urea-guanylurea, 3:1. 130° cure | 6,900 g. $H_2O$; 690 g. $H_3PO_4$ (85%); 1,080 g. urea | 20 hrs. at 100° C; 2 hrs. at 130° C | No; Yes; No | 13; 15; 18 | 4.4 | 20; 42 | 0; 62 | 46 | 61 |
| 19% urea-phosphoric acid, 3:1. 140° cure | 6,900 g. $H_2O$; 690 g. $H_3PO_4$ (85%); 1,080 g. urea | 20 hrs. at 100° C; ½ hr. at 140° C | No; Yes; No | 16; 17; 21 | 4.4 | 20; 58 | 0; 144 | 51 | 61 |
| 19% urea-phosphoric acid, 3:1. 140° cure | 6,900 g. $H_2O$; 690 g. $H_3PO_4$ (85%); 1,080 g. urea | 20 hrs. at 100° C; 1 hr. at 140° C | No; Yes; No | 13; 16; 19 | 5.0 | 20; 33 | 0; 6 | 32 | 61 |
| 22% urea-phosphoric acid, 4:1. 140° cure | 6,900 g. $H_2O$; 690 g. $H_3PO_4$ (85%); 1,440 g. urea | 20 hrs. at 100° C; 2 hrs. at 140° C | No; Yes; No | 13; 14; 20 | 5.5 | 22; 29 | 0; 6 | 49 | 78 |
| 20% acetamide: Phosphoric acid. 90° cure | 3.9 parts $H_3PO_4$ (85%); 3.3 parts metaphosphoric acid; 13.3 parts acetamide; 79.5 parts water | 16 hrs. at 70° C; 4 hrs. at 90°C | No; Yes | | | 37; 79 | 64; 90 | | |
| 20% urea: Cyanoacetamide: Phosphoric acid. 90° cure | 3.8 parts urea; 10.8 parts cyanoacetamide; 6.0 parts $H_3PO_4$ (85%); 79.4 parts water | 16 hrs. at 70° C; 4 hrs. at 90° C | No; Yes | | | 24; 75 | 1; 63 | | |
| 20% semicarbazide hydrochloride. 90° cure | 5.2 parts semicarbazide hydrochloride; 3.8 parts guanidine carbonate; 3.8 parts cyanoacetamide; 3.0 parts urea; 4.2 parts $H_3PO_4$ (85%); 80.0 parts water | 16 hrs. at 70° C; 4 hrs. at 90° C | No; Yes | | | 22; 77 | 0; 72 | | |

In studying the data given in the table, it will be noted that wood treated with the pre-reacted solutions of dicyandiamide and phosphoric acid, when cured within the prescribed range of 70–100° C., had non-leachable flame-retardant properties and virtually undiminished impact strength. It will be observed that the specimens cured at 50° C. showed poor fire retardance after leaching and diminished impact strength. Those cured at 150° C. showed excellent fire retardance after leaching, but their impact strength was considerably impaired. In the test wherein the impregnation formulation was not pre-reacted, excellent fire-retardance was also obtained, and there was likewise no loss in impact strength. The purified guanylurea phosphate, when preformed and then admixed with water to form an impregnating solution, provided a wood product having an unsatisfactory flame-retardance after leaching.

In contrast with the method of the present invention, the ureaphosphoric acid system failed to give a non-leachable flame-retardant product of undiminished impact strength. In the case of specimens which were cured at a temperature of at least 140° C. for one hour or more, suitable non-leachable flame-retardance was obtained, but the impact strength of the product was markedly diminished. When a specimen was given a final cure of 140° C. for only ½ hour, the flame-retardance of the product after leaching was unsatisfactory and the impact strength was also reduced. Using a 100° C. curing temperature with an impregnation formulation comprising a mixture of urea and phosphoric acid gave a product having poor flame-retardance after leaching, and somewhat diminished impact strength. The formulations comprising phosphoric acid in combination with other bases such as acetamide, cyanoacetamide, semicarbazide hydrochloride, and guanidine carbonate likewise gave an unsatisfactory product using a final curing temperature of 90° C.

EXAMPLE II.—FIRE-RETARDANCE

A series of experiments was made, following the procedure of Example I, to determine the concentration of dicyandiamide and phosphoric acid in the treating solution necessary to impart (a) flame-retardance to an unleached specimen and (b) flame-retardance to a leached specimen. We have already indicated that a fire tube weight loss of greater than 50% is considered to be poor by workers in the art. Impregnation, drying, and curing of the southern pine specimens was accomplished by the procedure of Example I. The data is shown in Table III.

It is apparent from Table III that treating solutions of 10% concentration are adequate to impart substantial protection to unleached specimens. Non-leachable flame-retardance is obtained using a treating solution having a concentration of between 15 and 20%.

EXAMPLE III.—DIMENSIONAL STABILITY

Ponderosa pine dimensional stability wafers, 1⅜" x 10" x ¼", were impregnated with treating solutions of varying strength, dried and cured according to the procedure of Examples I and II. The specimens were cut so that the long dimension was in the tangential direction, in which most swelling occurs in wood. The specimens were weighed and measured in the tangential direction before treatment. After curing, the specimens, along with previously oven dried controls, were weighed and measured again. They were then open-stacked in a high humidity room at 80° F. and 70% relative humidity. When the specimens had reached equilibrium in this high humidity atmosphere, they were weighed and measured to provide a comparison with the oven dry readings. Individual groups of five specimens were then placed in separate steel treating pans and pressure impregnated for 24 hours with distilled water. On removal from the water, the specimens were weighed and measured to provide the "water wet" values. The data is shown in Table IV.

It is apparent from the data in Table IV that wood treated with the novel impregnation formulations is less hygroscopic than untreated wood. The wood treatment of the present invention causes a measurable decrease in the equilibrium moisture content of the wood, and a substantial reduction in the swelling when the wood is exposed to high humidity. Impregnation with solutions of 20% strength resulted in a 50% reduction in the swelling of the wood samples treated with liquid water. The improved dimensional stability is diminished to some extent upon prolonged leaching.

EXAMPLE IV.—DECAY RESISTANCE

Twenty-eight southern yellow pine soil-block specimens (¾" cubes) were treated with varying concentrations of

TABLE III

*Results of fire-tube tests on southern pine specimens treated with five concentrations of a dicyandiamide: phosphoric acid fire-retardant formulation*

| Treating solution concentration | Formulation | Drying Cycle, °C. | Leached | Weight [1] Increase caused by Treatment, percent of original dry weight | Weight [1] Increase Resistant to Leaching, percent of original dry weight | Percent [1] Weight Loss in Fire-Tube | After-Flame [1] (seconds) |
|---|---|---|---|---|---|---|---|
| 25% | 11.6 parts dicyandiamide<br>15.8 parts H$_3$PO$_4$, (85%)<br>72.6 parts H$_2$O | 20 hrs. at 70°C<br>4 hrs. at 90°C | No<br>Yes | 33<br>34 | <br>13.0 | 13<br>23 | 0<br>0 |
| 20% | 9.3 parts dicyandiamide<br>12.6 parts H$_3$PO$_4$, (85%)<br>78.1 parts H$_2$O | 20 hrs. at 70°C<br>4 hours at 90°C | No<br>Yes | 25<br>26 | <br>9.8 | 16<br>27 | 0<br>0 |
| 15% | 7.0 parts dicyandiamide<br>9.5 parts H$_3$PO$_4$, (85%)<br>83.5 parts H$_2$O | 20 hrs. at 70°C<br>4 hrs. at 90°C | No<br>Yes | 15<br>17 | <br>5.2 | 20<br>57 | 0<br>75 |
| 10% | 4.7 parts dicyandiamide<br>6.3 parts H$_3$PO$_4$, (85%)<br>89.0 parts H$_2$O | 20 hrs. at 70°C<br>4 hrs. at 90°C | No<br>Yes | 10<br>11 | <br>3.0 | 26<br>60 | 0<br>47 |
| 5% | 2.3 parts dicyandiamide<br>3.2 parts H$_3$PO$_4$, (85%)<br>94.5 parts H$_2$O | 20 hrs. at 70°C<br>4 hrs. at 90°C | No<br>Yes | 6.7<br>6.6 | <br>1.2 | 55<br>69 | 71<br>52 |

[1] Average of five specimens.

TABLE IV

*Summary of weight and dimension changes of ponderosa pine dimensional stability wafers treated with four concentrations of dicyandiamide:phosphoric acid*

| Treating Solution Concentration, Percent Solids | Weight Increase Due to Treatment (Percent of Weight of Dry Wood) | Length Increase Due to Treatment (Percent of length of Dry Wood) | Weight Increase in High Humidity (Percent of Dry Weight after Treatment) | Length Increase in High Humidity (Percent of Dry length after Treatment) | Reduction in Swelling, Percent | Weight Increase when Water Wet (Percent of Dry length after Treatment) | Length Increase when Water Wet (Percent of Dry length after Treatment) | Reduction in Swelling, Percent |
|---|---|---|---|---|---|---|---|---|
| 20 | 38.5 | 4.18 | 10.3 | 2.16 | 33 | 102 | 3.70 | 50 |
| 15 | 27.6 | 3.97 | 11.4 | 2.18 | 32 | 119 | 3.81 | 48 |
| 10 | 18.0 | 2.73 | 11.5 | 2.58 | 20 | 133 | 4.96 | 33 |
| 5 | 8.1 | 2.17 | 12.3 | 2.52 | 22 | 154 | 5.41 | 26 |
| 0 | | | 13.2 | 3.23 | | 168 | 7.35 | |

The above values represent the average of five specimens.
The high humidity conditions were 80° F. and 70% relative humidity.
The specimens were cured at 100° C. after treatment to obtain the oven dry weight.

the impregnating solution of the present invention and were thereafter cured by the method described in Example I. One-half of the soil-block specimens were weathered on the laboratory weathering wheel, which provided alternate exposure to water, forced draft air, and ultraviolet radiation for 30 days. Four blocks, two weathered and two unweathered, were chemically analyzed for nitrogen and phosphorus. The remaining 24 blocks were placed in culture bottles and exposed to the action of three species of wood destroying fungi (Madison 534, 617 and 698), for three months. The weight loss during exposure is a measure of the degree of fungal attack. The data is shown hereunder in Table V.

TABLE V

*Results of soil-block bioassay and chemical analysis of pine specimens treated with five concentrations of a dicyandiamide:phosphoric acid fire-retardant formulation*

| Percent Treating Solution Concentration | Artificially Weathered | Percent Weight Loss During Exposure to [1]— | | | Nitrogen Content,[2] percent of Oven dry wood weight | Phosphorus Content,[2] percent of Oven dry wood weight |
|---|---|---|---|---|---|---|
| | | Lentinus lepideus Madison 534 | Lenzites trabea Madison 617 | Poria monticola Madison 698 | | |
| 25 | No | 0 | 0 | 0 | 7.22 | 3.6 |
| 25 | Yes | 24 | 33 | 24 | 0.65 | 1.0 |
| 20 | No | 0.8 | 0 | 0 | 5.91 | 3.2 |
| 20 | Yes | 13 | 30 | 42 | 0.57 | 0.6 |
| 15 | No | 0.2 | 0.2 | 0.2 | 4.04 | 1.7 |
| 15 | Yes | 20 | 33 | 44 | 0.49 | 0.4 |
| 10 | No | 0 | 1 | 1 | 3.72 | 1.5 |
| 10 | Yes | ([3]) | 34 | 47 | 0.37 | 0.4 |
| 5 | No | 0.6 | 14.6 | 0.6 | 2.65 | 0.9 |
| 5 | Yes | 15 | 40 | 48 | 0.26 | 0.2 |
| Untreated | No | 29 | 31 | 38 | 0.04 | 0.01 |
| Control | Yes | 29 | 31 | 32 | 0.03 | 0.03 |

[1] Soil-block results are averages of four values except where there was obvious contamination.
[2] Chemical analyses were made on sample consisting of four soil-block specimens ground together.
[3] All these cultures were contaminated.

The wet environment of the culture bottles had the effect of leaching unbound dicyandiamide and phosphoric acid from the unweathered specimens. However, it will be observed from Table V that among the unweathered samples, only that treated with an impregnation solution of 5% concentration and exposed to the attack of Madison 617 decayed to a measurable extent. All of the weathered specimens showed visible signs of fungal attack and high weight losses indicative of such attack. When the wood product is to be used in exterior construction that will be exposed to considerable weathering, decay resistance thereof is greatly enhanced by using the fortified impregnation solutions of the present invention. Thus, to make a product that will withstand inclement weather conditions, from 2 to 5% of chromated zinc arsenate, chromated zinc chloride, or chromated copper arsenate should be added to the impregnating solution and thereby incorporated into the wood.

EXAMPLE V.—COMPARISON WITH COMMERCIAL FIRE RETARDANTS

Following the procedure of Example I, a comparison was made, at equal retentions, between the effectiveness of the novel impregnation formulation of the present invention and that of four commercially available fire retardants. All five formulations were made up to contain 20% by weight of active ingredients. The formulations for commercial treatments A, B, and C were prepared according to the American Wood Preservers Association Manual of Recommended Practice. The formulation for commercial treatment D was obtained from U.S. Patent 1,994,073. The formulation of the present invention was not pre-reacted. The data is shown in Table VI.

A study of Table VI indicates that commercial treatments B, C, and D failed to provide non-leachable flame-retardance. Treatment with all four of the commercial formulations resulted in a wood product of considerably diminished impact strength. In contrast, impregnation of wood using the novel formulation of the present invention resulted in a non-leachable flame-retardant wood of undiminished impact strength.

EXAMPLE VI.—CORROSION TESTING OF THE NOVEL IMPREGNATION FORMULATION

A 500 gram batch of the impregnation formulation of the present invention containing 20% by weight dicyandiamide and phosphoric acid was made by combining appropriate amounts of technical grade dicyandiamide, reagent grade 85% phosphoric acid, and distilled water. The completely dissolved and thoroughly mixed batch was separated into three equal volumes which were placed in 2000 ml. glass beakers.

Two low carbon steel corrosion specimens approximately 1/16" x 2" x 3" were pre-weighed and placed in each of the three solutions. The solution in the first beaker was maintained at 90° C. for one week. The solution in the second beaker was pre-reacted by heating to 90° C. for two hours; the temperature was then allowed to drop to 50° C. and the two corrosion specimens were placed therein. The third solution was kept at 50° C. without initial pre-reaction for one week. After the six corrosion specimens had been in the heated solutions

TABLE VI

*Results of fire-tube and impact strength tests on pine specimens treated with four commercial formulations and the dicyandiamide:phosphoric acid fire-retardant formulation*

| Treatment | Formulation | Cure Conditions, °C. | Leached | Weight Increase[1][2] Caused by Treatment (Percent of original dry weight) | Weight Increase[1] Resistant to Leaching (Percent of original dry weight) | Percent[1] Weight Loss in Fire-Tube Test | After-Flame,[1] seconds | After-Glow,[1] seconds | Impact[2] Strength, In.-lbs. |
|---|---|---|---|---|---|---|---|---|---|
| 20% commercial solution A. | 16 parts chromated zinc chloride. 2 parts (NH$_4$)$_2$SO$_4$ 2 parts H$_3$BO$_3$ 80 parts H$_2$O | 20 hrs. at 70° 4 hrs. at 90° | No Yes No | 31 31 33 | 6.7 | 15.0 30.0 | 0 *4 | 5 300+ | 37 |
| 20% commercial solution B. | 2 parts NH$_4$H$_2$PO$_4$ 12 parts (NH$_4$)$_2$SO$_4$ 2 parts Na$_2$B$_4$O 4 parts H$_3$BO$_3$ 80 parts H$_2$O | 20 hrs. at 70° 4 hrs. at 90° | No Yes No | 27 26 24 | 0.0 | 15.8 71.4 | 0 65 | 0 0 | 31 |
| 20% commercial solution C. | 7 parts ZnCl$_2$ 7 parts (NH$_4$)$_2$SO$_4$ 5 parts H$_3$BO$_3$ 1 part Na$_2$Cr$_2$O$_7$.2H$_2$O 80 parts H$_2$O | 20 hrs. at 70° 4 hrs. at 90° | No Yes No | 28 28 26 | 2.8 | 16.0 71.0 | 0 95 | 0 300+ | 36 |
| 20% commercial solution D. | 5.7 parts ZnCl$_2$ 11.4 parts (NH$_4$)$_2$SO$_4$ 2.8 parts NH$_4$H$_2$PO$_4$ 0.1 part Na$_2$CrO$_4$ 80.0 parts H$_2$O | 20 hrs. at 70° 4 hrs. at 90° | No Yes No | 30 30 29 | 2.1 | 16.5 71.1 | 0 83 | 0 0 | 36 |
| 20% dicyandiamide: Phosphoric acid. | 9.3 parts dicyandiamide 12.6 parts H$_3$PO$_4$, 85% 78.1 parts H$_2$O | 20 hrs. at 70° 4 hrs. at 90° | No Yes No | 32 31 32 | 8.5 | 16.5 28.0 | 0 *27 | 0 0 | 62 |
| Untreated impact controls. | | | No | | | | | | 57 |

[1] Average of 5 specimens.
[2] Average of 20 specimens for impact strength determinations.
[3] Both values marked with asterisk are averaged values representing After-Flame of only 1 of the 5 specimens.

for seven days, they were removed, cleaned electrolytically and weighed a second time to determine the amount of metal lost during exposure. Results are shown below in Table VII.

TABLE VII

*Corrosion rate of low carbon steel in a 20% dicyandiamide:phosphoric acid fire retardant formulation*

| Temperature of Exposure, °C. | Prereacted before Sample Immersion | Corrosion Rate, Inches per Year | |
|---|---|---|---|
| | | First Specimen | Second Specimen |
| 90 | | 0.096 | 0.113 |
| 50 | Yes | 0.034 | 0.034 |
| 50 | No | 0.038 | 0.040 |

A solution that produces less than 0.050" per year of corrosion is considered acceptable for use in chemical plants. It can be seen that the novel formulations of the present invention can be safely used and stored at temperatures of 50° C. either in the pre-reacted or unreacted state.

We have thus provided a novel wood treatment whereby wood can be stabilized against dimensional change and rendered decay-resistant. A non-leachable flame-retardance can be imparted to the wood with the use of substantially non-corrosive treating solutions. The treated wood product has a substantially undiminished impact strength. Wood treated according to the novel method of the present invention is quite suitable for exterior uses such as for railroad ties, ship decking, boats, and stadium bleachers.

We claim:

1. Method of treating wood to impart thereto fire retardance without impairing the impact strength of the wood comprising impregnating wood with a solution consisting essentially of from 10 to 25 percent by combined weight of dicyandiamide and phosphoric acid and 90 to 75 percent by weight water, said dicyandiamide and phosphoric acid being present in a mol ratio of about 1:1 to 2:1 respectively, and heating the impregnated wood to a final temperature between about 70 and 100° C., thereby producing a flame-retardant wood of susbtantially undiminished impact strength.

2. Method according to claim 1 wherein the aqueous treating solution contains from 2 to 5% by weight of a material selected from the group consisting of chromated zinc arsenate, chromated zinc chloride and chromated copper arsenate, whereby the treated wood product has enhanced resistance to fungal attack.

3. Method of treating wood to impart thereto non-leachable fire retardance without impairing the impact strength of the wood comprising impregnating wood with a solution consisting essentially of from about 17.5 to 25 percent by combined weight of dicyandiamide and phosphoric acid and 82.5 to 75 percent by weight water, said dicyandiamide and phosphoric acid being present is a mol ratio of about 1:1 to 2:1 respectively, by the application of vacuum and pressure to said wood, drying the impregnated wood and curing teh dried wood to a temperature between about 70 and 100° C., thereby producing a non-leachable flame-retardant wood of substantially undiminished impact strength.

4. Method of treating wood to impart thereto a fire retardance characterized by a weight loss of the wood after leaching of less than 50 percent in a fire-tube test without impairing the impact strength of the wood comprising impregnating wood with a solution containing an impregnator consisting essentially of dicyandiamide and phosphoric acid in a mol ratio of about 1:1 to 2:1 respectively, said impregnator being present in said solution in a quantity sufficient to be retained by the wood product in an amount equal to 17.5 to 30 percent based on the original dry weight of the wood, and heating the impregnated wood to a final temperature between about 70 and 100° C., thereby producing a flame-retardant wood of substantially undiminished impact strength characterized by a weight loss of the wood after leaching of less than 50 percent in a fire-tube test.

5. Product of the method of claim 4.

References Cited in the file of this patent

UNITED STATES PATENTS

| | | |
|---|---|---|
| 688,932 | Chanute | Dec. 17, 1901 |
| 2,482,755 | Ford et al. | Sept. 27, 1949 |
| 2,523,626 | Jones | Sept. 26, 1950 |
| 2,632,741 | Eckert | Mar. 24, 1953 |
| 2,648,641 | Robison | Aug. 11, 1953 |
| 2,757,102 | Wooding et al. | July 31, 1956 |

FOREIGN PATENTS

| | | |
|---|---|---|
| 476,043 | Great Britain | Nov. 29, 1937 |
| 811,887 | France | Apr. 24, 1937 |